US012532104B2

(12) United States Patent
Li et al.

(10) Patent No.: US 12,532,104 B2

(45) Date of Patent: Jan. 20, 2026

(54) OPEN-EAR HOOK-TYPE WEARABLE SOUND PRODUCING DEVICE

(71) Applicant: Shenzhen Dancing Future Technology Ltd., Shenzhen (CN)

(72) Inventors: Haoqian Li, Shenzhen (CN); Chuanbo Wang, Shenzhen (CN)

(73) Assignee: SHENZHEN DANCING FUTURE TECHNOLOGY LTD., Shenzhen (CN)

( * ) Notice: Subject to any disclaimer, the term of this patent is extended or adjusted under 35 U.S.C. 154(b) by 230 days.

(21) Appl. No.: 17/969,125

(22) Filed: Oct. 19, 2022

(65) Prior Publication Data

US 2023/0130211 A1 Apr. 27, 2023

(30) Foreign Application Priority Data

Oct. 21, 2021 (CN) ......................... 202122537604.8

(51) Int. Cl.
*H04R 1/10* (2006.01)
*H04R 1/28* (2006.01)

(52) U.S. Cl.
CPC ........... *H04R 1/105* (2013.01); *H04R 1/2823* (2013.01)

(58) Field of Classification Search
CPC ...................................................... H04R 1/105
USPC ................................................. 381/373, 381
See application file for complete search history.

(56) References Cited

U.S. PATENT DOCUMENTS

2005/0084129 A1* 4/2005 Bergere .................. H04R 1/26 381/370
2006/0165249 A1* 7/2006 Sato ....................... H04R 5/033 381/396
2009/0092271 A1* 4/2009 Fay ...................... H04R 25/604 381/328
2013/0039524 A1* 2/2013 Jones ..................... H04R 5/033 381/378
2015/0023515 A1* 1/2015 Reimert ............... H04R 1/1083 381/71.6
2018/0288518 A1* 10/2018 Schmidt ................. H04R 1/028
2019/0130930 A1* 5/2019 Tong ................... G10L 21/0208
2019/0238971 A1* 8/2019 Wakeland .............. H04R 1/347
(Continued)

FOREIGN PATENT DOCUMENTS

CN 216217487 U 4/2022
JP 3240241 U 12/2022

OTHER PUBLICATIONS

Notice of Allowance in Chinese Patent Application No. 202122537604.8, mailed Jan. 30, 2022, 2 pages.

*Primary Examiner* — Katherine A Faley
(74) *Attorney, Agent, or Firm* — Astute IP Law Group

(57) ABSTRACT

The present invention discloses an open-ear hook-type wearable sound producing device, including a main body and an ear hook connected to the main body, wherein at least one speaker and at least one microphone are arranged in the main body; one side, facing a human ear, of the main body is provided with a forward vent; a distance between the orifice of the forward vent and an ear canal entrance point (EEP) is 0.1 to 50 mm; and a distance between a pickup end of the at least one microphone and the EEP is 0.5 to 10 mm. The structure and layout of the present invention are rational, which is helpful to improve noise cancellation performance and is suitable to wear for long listening sessions.

8 Claims, 10 Drawing Sheets

(56) References Cited

U.S. PATENT DOCUMENTS

| | | | | |
|---|---|---|---|---|
| 2023/0061686 | A1* | 3/2023 | Wolfl | H04R 1/2853 |
| 2023/0091575 | A1* | 3/2023 | Koneru | H04R 1/105 381/328 |

* cited by examiner

OPEN-EAR HOOK-TYPE WEARABLE SOUND PRODUCING DEVICE

TECHNICAL FIELD

The present invention relates to headphones, in particular to an open-ear hook-type wearable sound producing device.

BACKGROUND

In a traditional ear hook-type headphone, it is necessary to seal a front cavity of a headphone speaker and a sound vent with an ear canal, and obtain the bass by forming a pressure sound field. This noise cancellation method is not suitable for application in, for example, open-ear hook-type headphone products. In addition, for some active noise cancellation headphones, high requirements are proposed for coordination between a speaker and a noise cancellation microphone. Without properly arranged position of the speaker or microphone, it is difficult to achieve an ideal active noise cancellation effect.

SUMMARY

The technical problem to be solved by the present invention is to, in view of the shortcomings of the related art, provide an open-ear hook-type wearable sound producing device which has a rational structure and layout, is helpful to improve noise cancellation performance and is suitable to wear for long listening sessions.

To solve the above technical problems, the present invention provides the following technical scheme.

An open-ear hook-type wearable sound producing device includes a main body and an ear hook connected to the main body, wherein at least one speaker and at least one microphone are arranged in the main body; one side, facing a human ear, of the main body is provided with a forward vent; a distance between the orifice of the forward vent and an ear canal entrance point (EEP) is 0.1 to 50 mm; and a distance between a pickup end of the at least one microphone and the EEP is 0.5 to 10 mm.

Optionally, one side, facing away from the human ear, of the main body is provided with an inverse vent.

Optionally, an XYZ coordinate reference system is established with the EEP defined as an origin point, a direction from the EEP to an outer side of the ear defined as a positive X-axis, a direction from the EEP to a front side of the ear defined as a positive Y-axis, and a direction from the EEP to an upper side of the ear defined as a positive Z-axis, so that coordinates of the orifice of the forward vent are located between (0.1 mm, −22.4 mm, −25.7 mm) and (15.3 mm, 23.2 mm, 33.3 mm) in the XYZ coordinate reference system.

Optionally, coordinates of the orifice of the inverse vent are located between (5 mm, −24 mm, −27.2 mm) and (29.3 mm, 25 mm, 36 mm) in the XYZ coordinate reference system.

Optionally, the at least one speaker has a cross-sectional area of 176.625 to 1256 mm$^2$ and a thickness of 2 to 13 mm.

Optionally, a distance between the pickup end of the at least one microphone and a diaphragm of the at least one speaker is 1.5 to 3 mm.

Optionally, the main body covers an area of 176.625 to 11304 mm$^2$ over an auricle of the human ear.

Optionally, the main body includes, but is not limited to, a circular, oval or racetrack-shaped plastic shell.

Optionally, a front cavity is arranged in the main body, and both the diaphragm of the at least one speaker and the at least one microphone are located in the front cavity.

Optionally, a noise-cancellation area formed by the at least one speaker and the at least one microphone covers an area of 176.625 to 11304 mm$^2$ over the auricle and an ear canal entrance area of the human ear.

In the open-ear hook-type wearable sound producing device disclosed by the present invention, the at least one speaker and the at least one microphone are simultaneously arranged in the main body, and the at least one speaker and the at least one microphone are as close to the EEP as possible within a set distance range; the at least one microphone, the at least one speaker and a processing circuit built in the main body constitute a feedback noise cancellation system, and better noise cancellation performance can be obtained by setting the positions of the at least one speaker and the at least one microphone in a rational manner. Compared with the related art, the present invention not only has a rational structure and layout, but is also suitable to wear for long listening sessions, and better meets application requirements for open-ear hook-type headphones.

DETAILED DESCRIPTION

The present invention will be further described in detail with reference to the accompanying drawings and embodiments.

Figure 1:
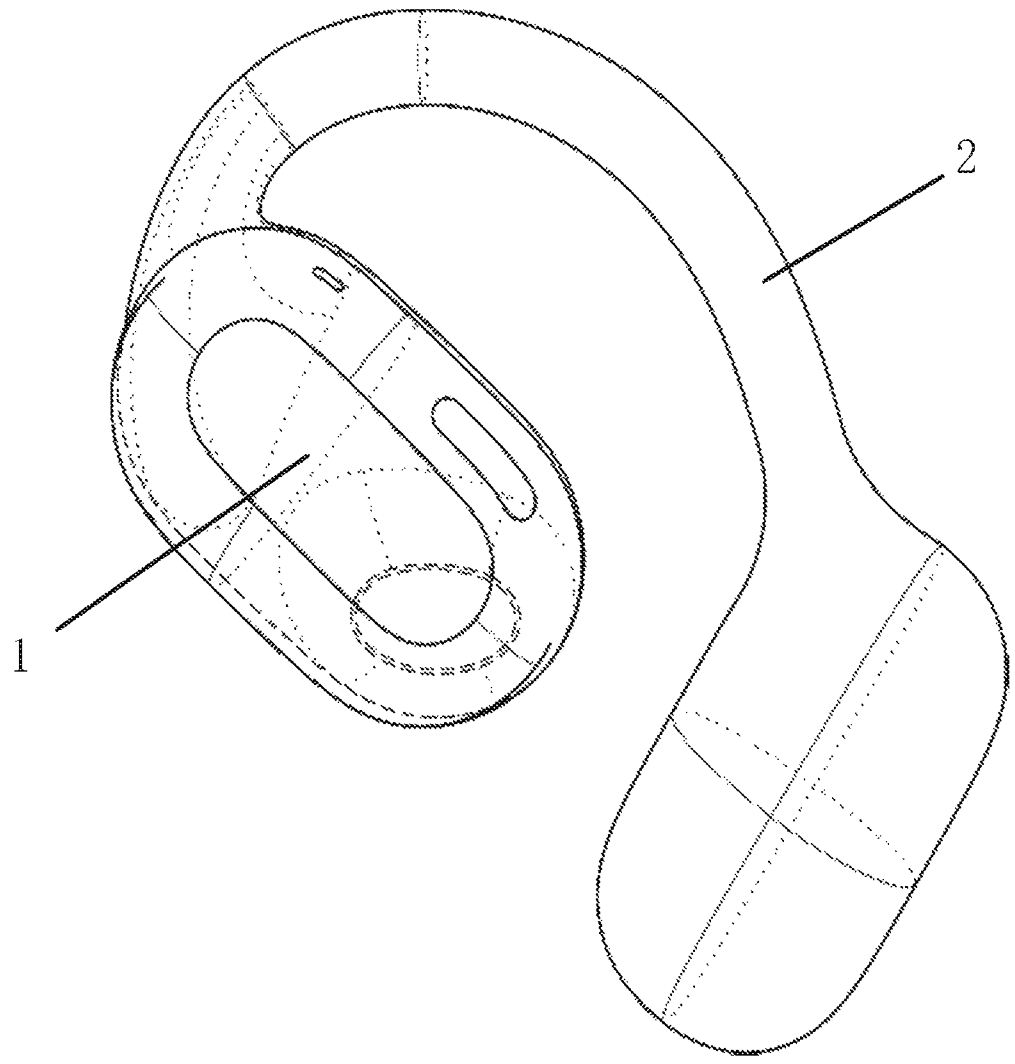
FIG. 1 is a schematic diagram of an open-ear hook-type wearable sound producing device of the present invention.
Figure 2:
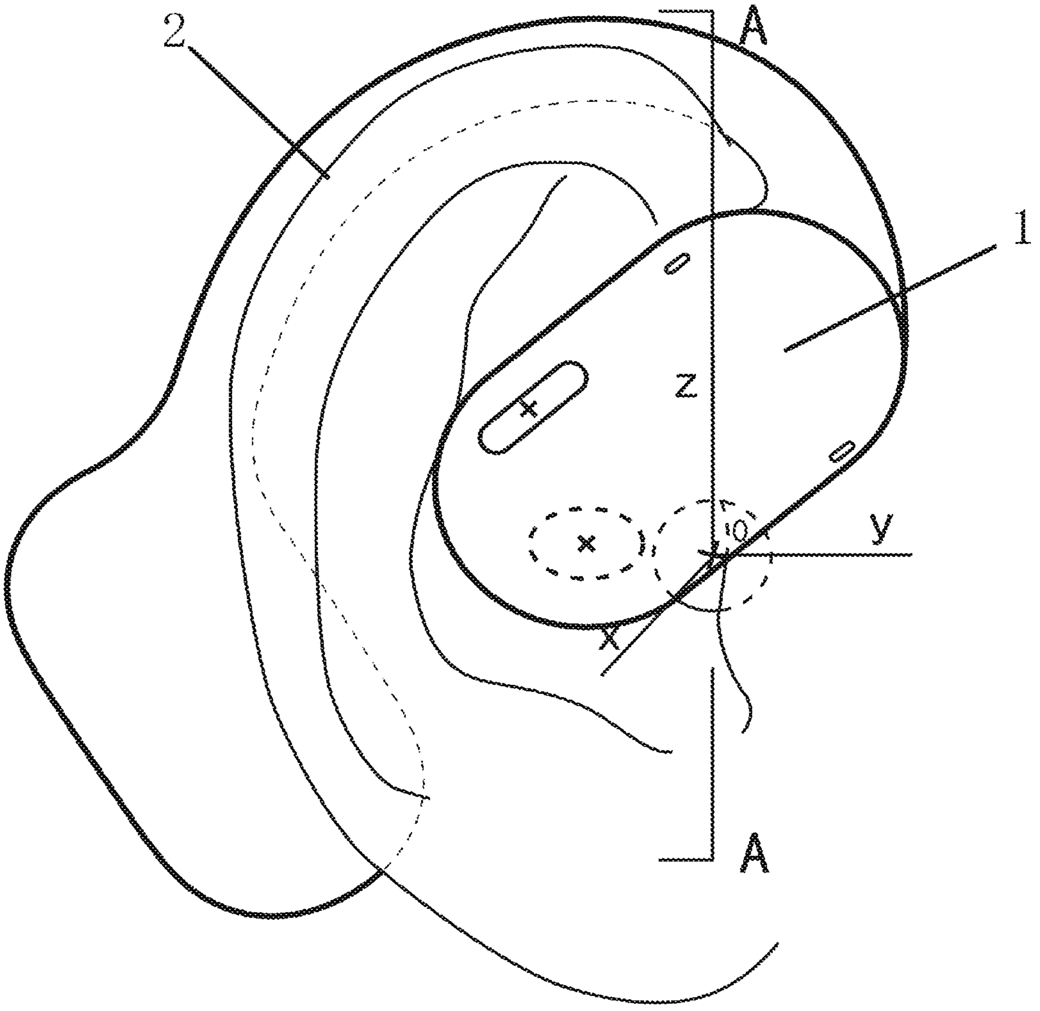
FIG. 2 is a schematic diagram of the present invention worn behind a human ear.
Figure 3:
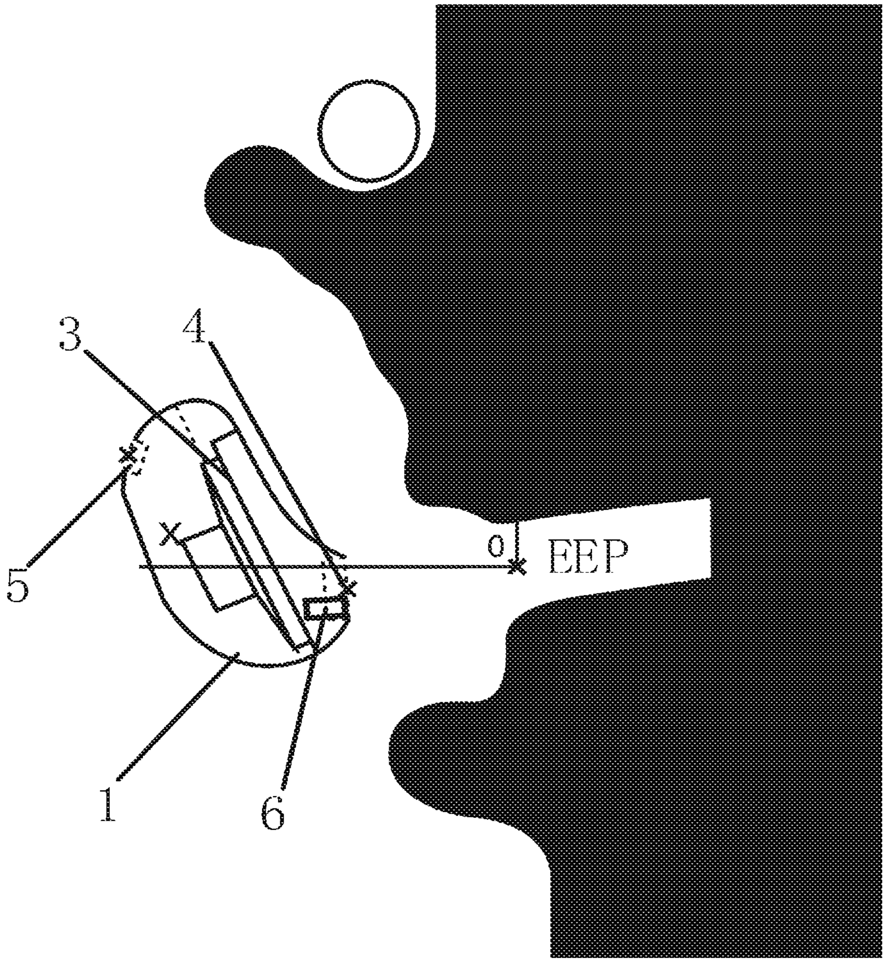
FIG. 3 is a cross-sectional view taken along a section line in FIG. 2.
Figure 4:
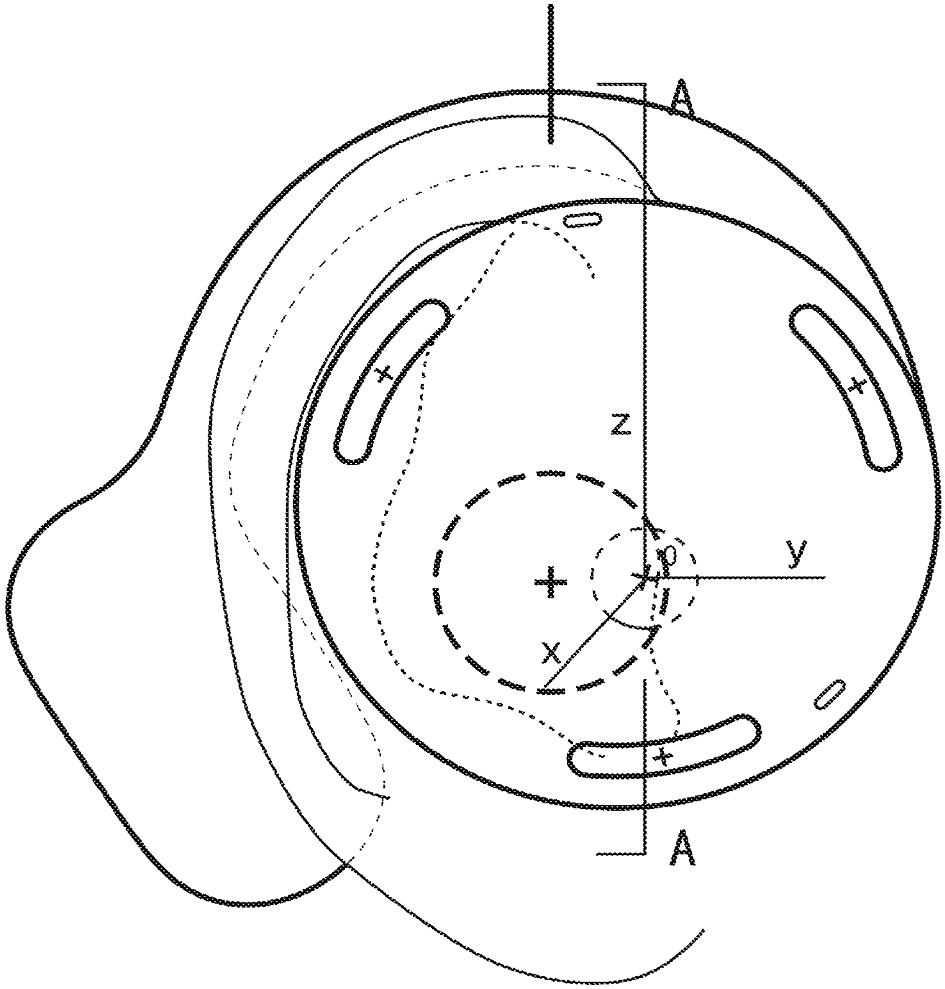
FIG. 4 is a schematic diagram of a first alternative implementation of the present invention.
Figure 5:
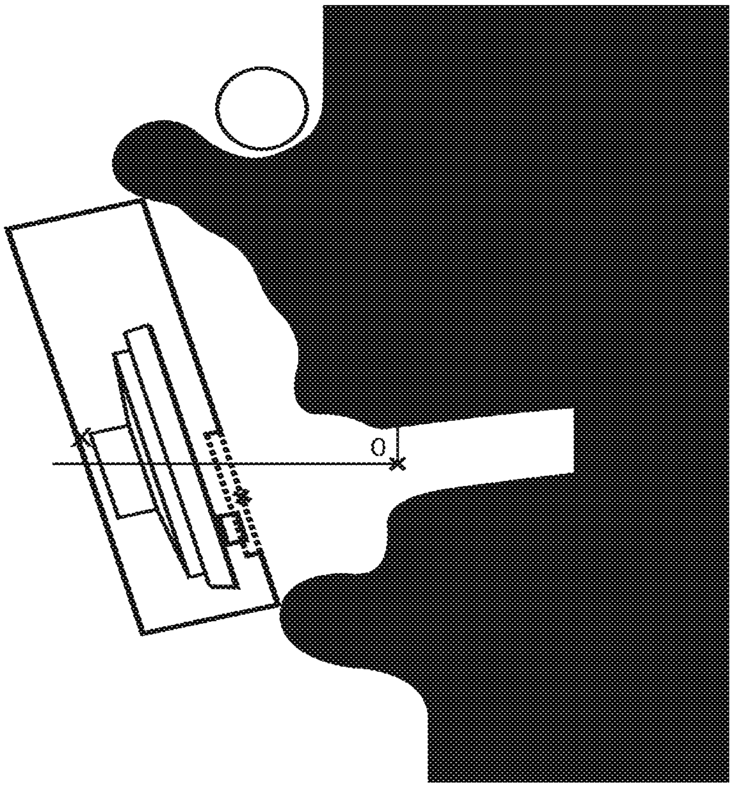
FIG. 5 is a cross-sectional view taken along a section line in FIG. 4.
Figure 6:
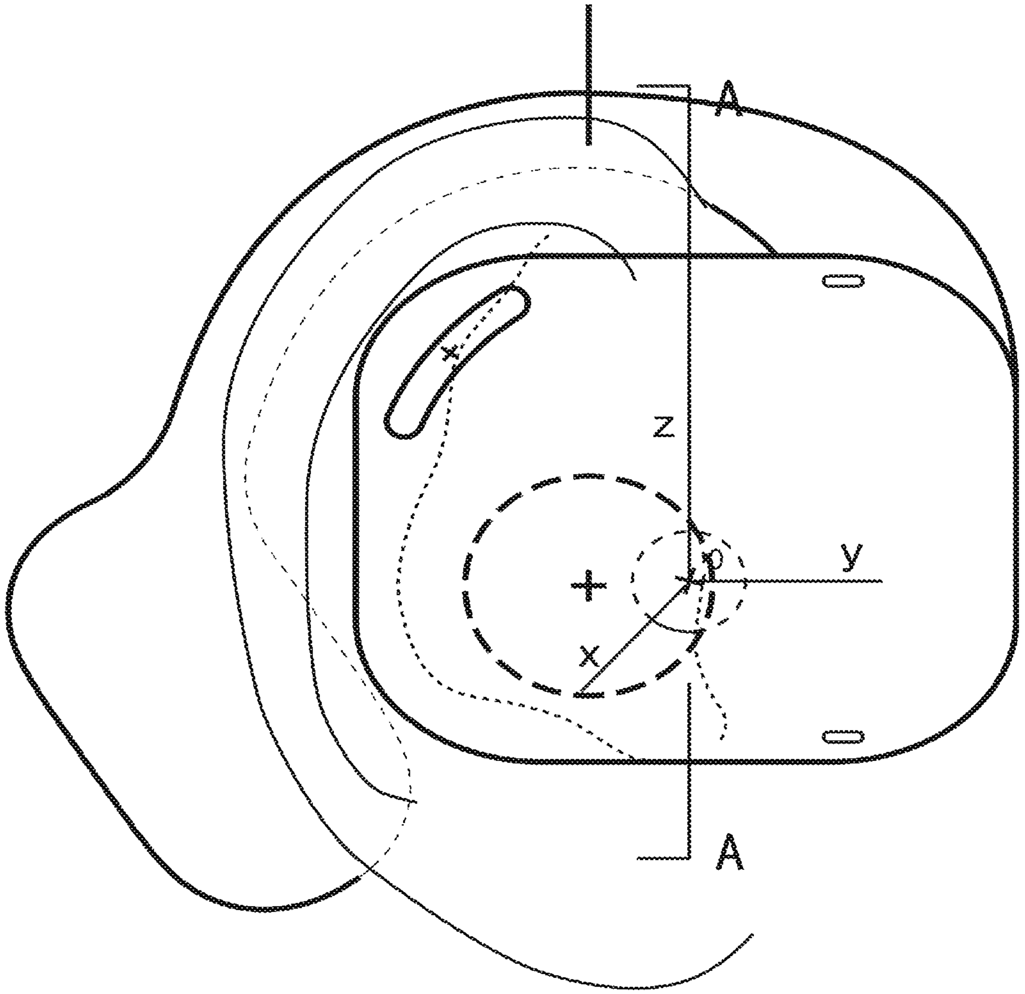
FIG. 6 is a schematic diagram of a second alternative implementation of the present invention.
Figure 7:
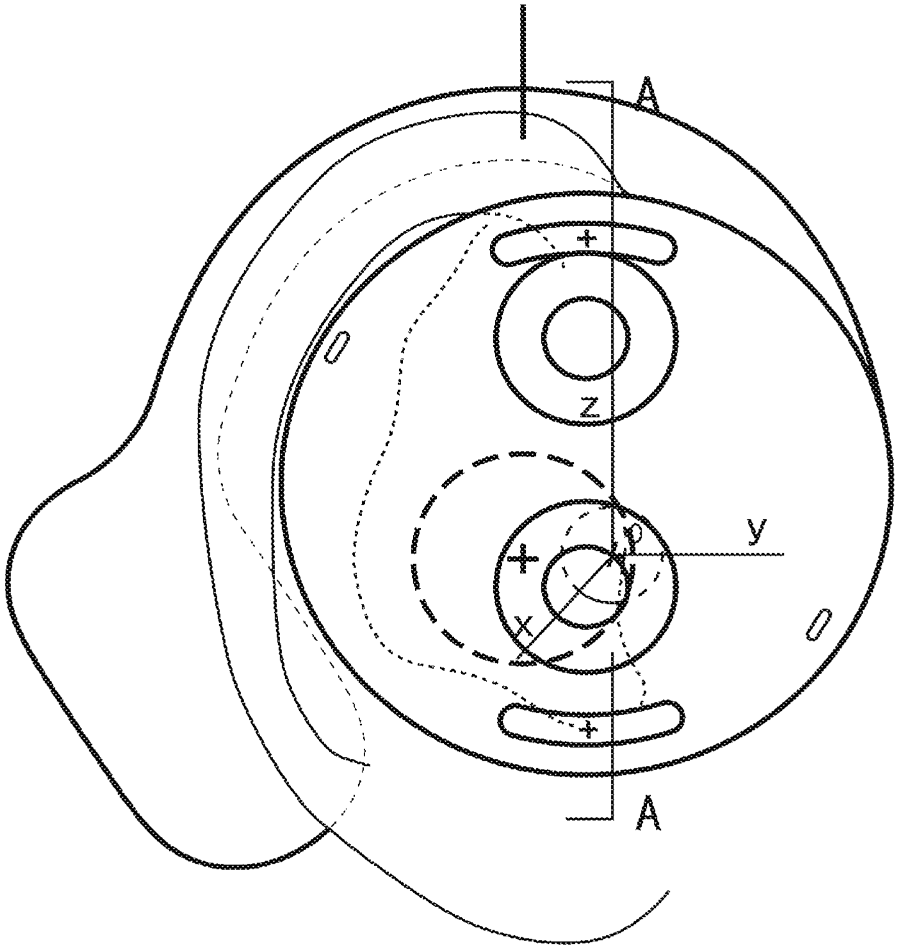
FIG. 7 is a schematic diagram of a third alternative implementation of the present invention.

The present invention discloses an open-ear hook-type wearable sound producing device, which, with reference to FIGS. 1-3, includes a main body and an ear hook connected to the main body, wherein at least one speaker and at least one microphone are arranged in the main body; one side, facing a human ear, of the main body is provided with a forward vent; a distance between the orifice of the forward vent and an EEP is 0.1 to 50 mm; and a distance between a pickup end of the at least one microphone and the EEP is 0.5 to 10 mm.

In the above structure, the at least one speaker and the at least one microphone are simultaneously arranged in the main body, and the at least one speaker and the at least one microphone are as close to the EEP as possible within a set distance range; and the at least one microphone, the at least one speaker and a processing circuit built in the main body constitute a feedback noise cancellation system, and better noise cancellation performance can be obtained by setting the positions of the at least one speaker and the at least one microphone in a rational manner. Compared with the related art, the present invention not only has a rational structure and layout, but is also suitable to wear for long listening sessions, and better meets application requirements for open-ear hook-type headphones.

As an improvement, one side, facing away from the human ear, of the main body is provided with an inverse vent.

In this embodiment, a speaker may be provided inside the main body, the forward vent of the main body is close to the ear canal entrance or in a concha area, the back side of the main body is provided with one or more inverse vents, and the inverse vents are far away from the ear canal entrance or the concha area. For this, the contents disclosed in the prior patent document with the publication number of "CN 214315572 U" and entitled "SOUND PRIVACY PROTECTION DEVICE" are also applicable to the present invention. To this end, in this embodiment, an XYZ coordinate reference system is established with the EEP defined as an origin point, a direction from the EEP to an outer side of the ear defined as a positive X-axis, a direction from the EEP to a front side of the ear defined as a positive Y-axis, and a direction from the EEP to an upper side of the ear defined as a positive Z-axis. The coordinates of the orifice of the forward vent are located between (0.1 mm, −22.4 mm, −25.7 mm) and (15.3 mm, 23.2 mm, 33.3 mm) in the XYZ coordinate reference system. The coordinates of the orifice of the inverse vent are located between (5 mm, −24 mm, −27.2 mm) and (29.3 mm, 25 mm, 36 mm) in the XYZ coordinate reference system.

Figure 9:
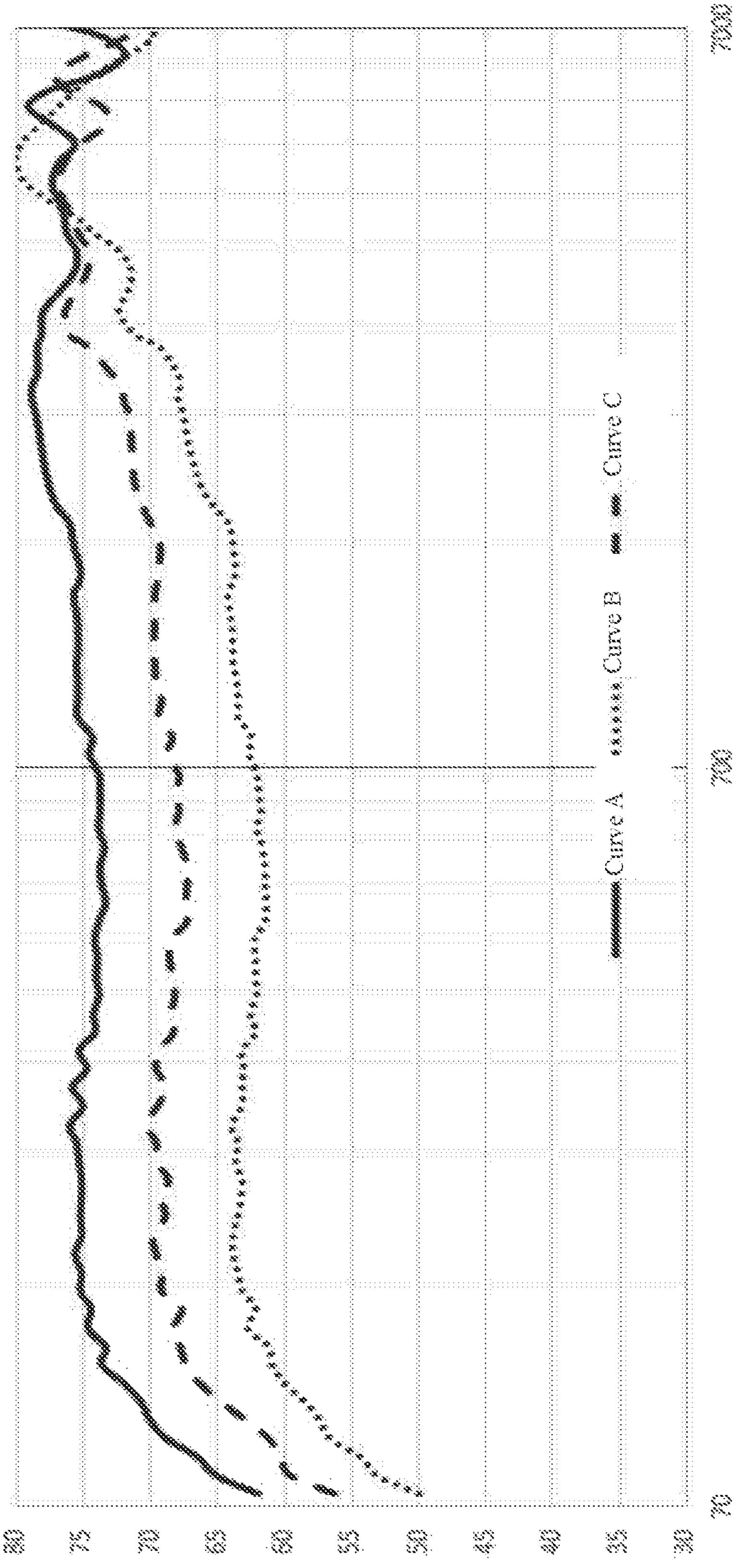
FIG. 9 is a frequency response graph with a forward vent arranged at different positions.

In the above spatial coordinate range, taking three wearable sound producing devices as examples, frequency response curves are obtained through tests respectively, with coordinates of the forward vents of the three wearable sound producing devices being different. Specifically, when the spatial coordinates of the forward vent are (3 mm, −3 mm, 1 mm), a frequency response curve A is obtained by testing; when the spatial coordinates of the forward vent are (6 mm, −5 mm, 1 mm), a frequency response curve B is obtained by testing, and when the spatial coordinates of the forward vent are (8 mm, −7 mm, 15 mm), a frequency response curve C is obtained by testing. The three frequency response curves obtained are shown in FIG. 9. It can be seen from curve A that when the spatial coordinates of the forward vent are closer to the EEP, the wearable sound producing device of the present invention has a better low frequency effect and the curve is smoother, and comparing curve B with curve C, especially according to curve C, it can be seen that when the spatial coordinates of the forward vent are farther from the EEP, attenuation of a low-frequency signal is more obvious, and the curve becomes unsmooth. The above are examples with the forward vent given specific coordinates. As the position of the inverse vent is fixed compared with that of the forward vent, details for the inverse vent will not be described in detail herein. The present invention fully considers the influence of the position of the forward vent on product performance in a specific implementation process, and the wearable sound producing device product of the present invention can significantly improve a sound quality effect within the space coordinate range required by the present invention.

Figure 8:
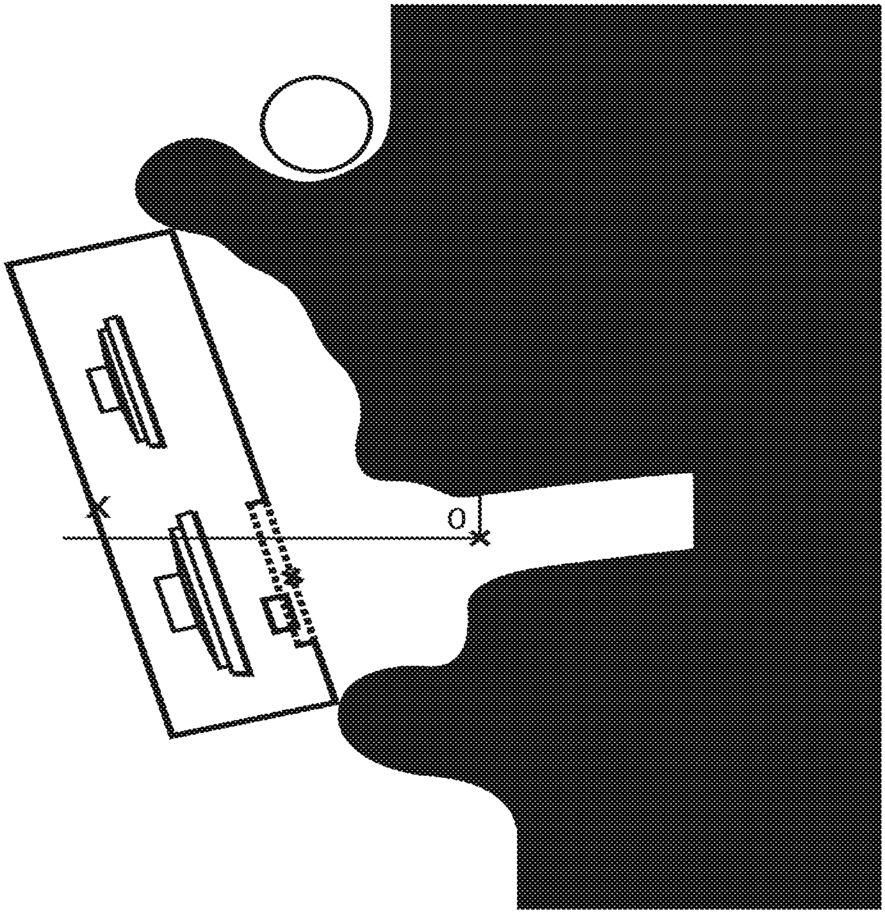
FIG. 8 is a cross-sectional view taken along a section line in FIG. 7.

As an alternative to the present invention, referring to FIG. 8, in this embodiment, a plurality of speakers may be provided in the main body. The forward vent of the main body is close to the ear canal entrance or in a concha area. The microphone or a microphone pickup hole is arranged in the front cavity where the forward vent is located. The main body is provided with one or more inverse vents, which is/are far away from the ear canal entrance or the concha area compared with the forward vent. It should be noted that the contents disclosed in the prior patent document with the publication number "CN 113316061 A" and entitled "AUDIO DEVICE FOR PREVENTING SOUND LEAKAGE" are equally applicable to the present invention. Further, the vents for the plurality of speakers are configured as follows: an XYZ coordinate reference system is established with the EEP defined as an origin point, a direction from the EEP to an outer side of the ear defined as a positive X-axis, a direction from the EEP to a front side of the ear defined as a positive Y-axis, and a direction from the EEP to an upper side of the ear defined as a positive Z-axis, so that coordinates of the orifice of the forward vent are located between (0.1 mm, −22.4 mm, −25.7 mm) and (15.3 mm, 23.2 mm, 33.3 mm) in the XYZ coordinate reference system; and coordinates of the orifice of the inverse vent are located between (5 mm, −24 mm, −27.2 mm) and (29.3 mm, 25 mm, 36 mm) in the XYZ coordinate reference system.

In this embodiment, the speaker has a cross-sectional area of 176.625 to 1256 $mm^2$ and a thickness of 2 to 13 mm.

In this embodiment, the main body may be provided with a plurality of speaker vents, which are connected to the front or back of the speaker through an internal cavity, and the vent(s) near the ear canal entrance can protrude into the concha, preferably as close as possible to an ear canal outlet. The main body is provided with a plurality of sound inlets, and the sound inlets communicate with the pickup hole of a microphone through a cavity or a pipeline. In order to further improve a sound producing effect, in this embodiment, preferably, the speaker has a cross-sectional area of 176.625 to 1256 $mm^2$ and a thickness of 2 to 13 mm.

With regard to the structural arrangement of the microphone, the front cavity of the main body is provided with one or more microphones or microphone pickup holes. The microphone(s) or microphone pickup hole(s) may face the speaker or face away from the speaker and face the ear canal or ear. The microphone(s) or microphone pickup hole(s) form a feedback noise cancellation system with the speaker and a circuit system. Better noise cancellation performance can be obtained by arranging the microphone(s) or the microphone pickup hole(s) closer to the ear canal, and the distance between the microphone or the microphone pickup hole and the EEP is 0.5 to 10 mm. The microphone(s) or the microphone pickup hole(s) is located in a diaphragm area of the speaker, so that better active noise cancellation performance can be obtained. For this end, this embodiment is preferably arranged as follows: a pickup end of the microphone(s) 6 is/are arranged in a diaphragm covering area of the speaker 3, and a distance between the pickup end of the microphone and a diaphragm of the speaker is 1.5 to 3 mm.

In practical application, the main body can be provided with a plurality of feedforward microphones and a microphone for phone calls for realizing feedforward active noise cancellation and feedback active noise cancellation. The sound producing part covers the auricle. Specifically, the main body covers an area of 176.625 to 11304 $mm^2$ over an auricle of the human ear. Further, as shown in FIGS. 4-8, the main body includes, but is not limited to, a circular, oval or racetrack-shaped plastic shell, that is, the shape of the main body is not limited to a circular, oval, racetrack shape, or other feasible shapes.

As an improvement, a front cavity is arranged in the main body, and both the diaphragm of the speaker and the microphone are located in the front cavity.

Further, the noise-cancellation area formed by the speaker and the microphone also covers the auricle and the ear canal, which specifically means that, the noise-cancellation area formed by the speaker(s) and the microphone(s) covers an area of 176.625 to 11304 $mm^2$ over the auricle and an ear canal entrance area of the human ear.

Figure 10:
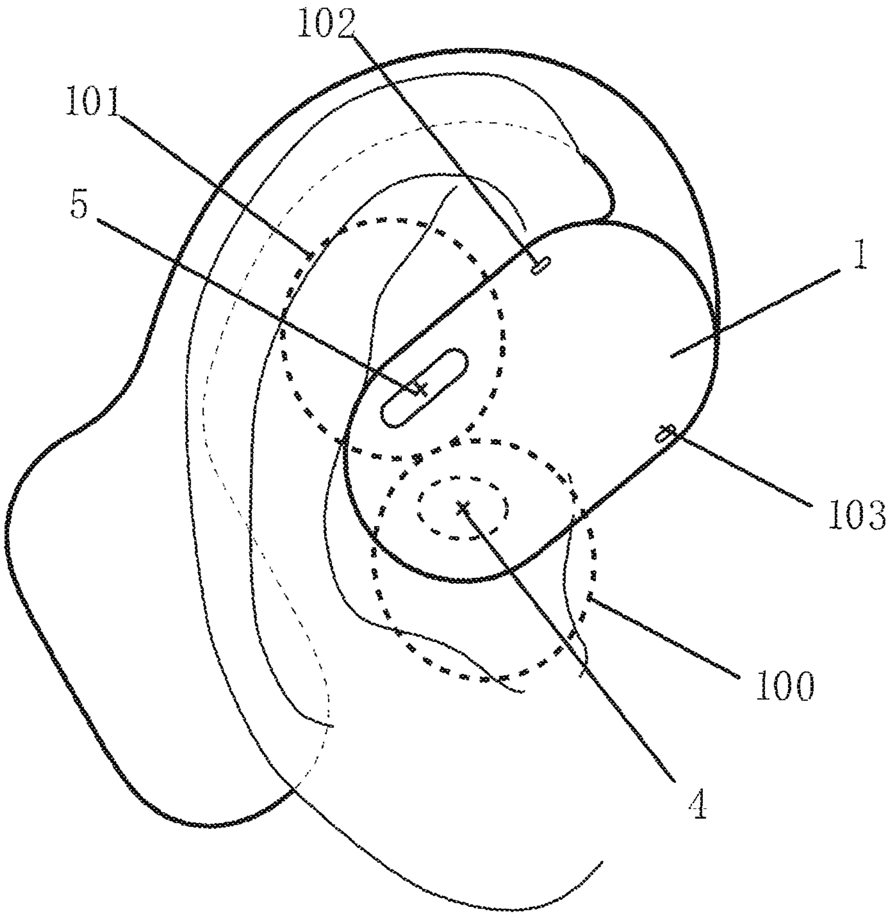
FIG. 10 is a schematic diagram of a first acoustic wave enhancement area and a second acoustic wave enhancement area.

In this embodiment, referring to FIG. 10, a first acoustic wave enhancement area 100 is formed around the forward vent 4 and a second acoustic wave enhancement area 101 is formed around the inverse vent 5. A plurality of the microphones 6 are provided, and the plurality of microphones 6 constitute a feedforward microphone assembly and are arrayed outside the first acoustic wave enhancement area 100 and the second acoustic wave enhancement area 101. Specifically, microphone holes corresponding to the microphones 6 are, for example, a first microphone hole 102 and a second microphone hole 103. This embodiment can combine the plurality of microphones 6 into a feedforward microphone group for canceling noise in different directions and noise in a specific direction. Specifically, this embodiment relates to design of vents of front and rear cavities. The vents of the front and rear cavities play a role of strengthening and weakening acoustic waves in space. The positions and direction axes of the vents are within an enhancement area of a sound field in space, and other positions will be represented as a sound weakening area. The microphone(s) of the main body is located in the acoustic wave weakening area, so as to reduce a sound signal from the speaker picked up by the microphone, which is beneficial to improvement of the feedforward active noise cancellation performance and phone call performance. Compared with existing headphone products, the present invention preferably arranges a plurality of microphones in the area where acoustic waves produced by the speaker in the main body are weakened, and moreover, the plurality of microphones form a microphone array. Based on the structural features, the present invention can not only cancel broadband noise, but can also pertinently cancel noise in a specific direction. Further, the present invention arranges a plurality of microphones at different positions of the main body, which can identify noise coming from all directions and carry out noise processing more effectively compared with a traditional single feedforward microphone, thereby having a better noise cancellation effect. In addition, the above structural features of the present invention are mainly applied to an open-ear hook-type headphone product, and the above structure of the present invention makes significant improvements to this particular type of headphone.

Referring to FIG. 1, the main body is connected to a battery compartment and a board compartment through an arc-shaped component, and the main body can be attached to and detached from the arc-shaped component. The arc-shaped part forms a certain angle with the main body (main functional part) and the battery compartment part, and the arc-shaped part is of twisted arc-shaped design and forms a certain angle by itself. For this structure, the contents disclosed in the prior patent with the publication number of "CN 113301463 A" and entitled "EAR CLAMPING STRUCTURE FOR HEADPHONE" are also applicable to the present invention. When the audio device of the present invention is worn on a human ear, the sound producing part, the arc-shaped connecting part and the battery compartment part form an audio device with a plurality of supporting parts. For this, the contents disclosed in the prior patent with the publication number of "CN 214014497 U" and entitled "HEADPHONE WITH MULTIPLE SUPPORTING PARTS" are equally applicable to the present invention. The sound producing part, the arc-shaped connecting part and the battery compartment part may be covered with silicone rubber, which is more skin-friendly and fits better.

The specific structure of the open-ear hook-type wearable sound producing device of the present invention is generally arranged in a hook shape and can be worn on a human ear in a hanging mode. The plastic shell of the main body is provided with a speaker unit or a plurality of speaker units for audio playback, a front cavity and a back cavity formed by the plastic shell and the speaker, and a microphone for picking up audio signals, which can pick up audio signals in the environment. A battery, a PCBA and other devices, the speaker(s), the feedforward microphone and the feedback microphone are provided in the product to constitute an active noise cancellation system. The present invention is different from a traditional ear hook headphone, the front cavity of the speaker does not need to be sealed with the ear canal, the speaker can work in an open space, and a user can also obtain better bass and sound quality experience. In addition, the sound producing device can be detachably connected to an arc-shaped ear hook, which has a twisted arc design and forms a certain angle by itself. The arc-shaped ear hook and the battery compartment part may be covered with silicone rubber, which is more skin-friendly and fits better.

The open-ear hook-type wearable sound producing device disclosed by the present invention, compared with the related art, has the beneficial effects that: the present invention effectively solves the problems that the noise cancellation effect of a traditional headphone is not good and the headphone cannot be worn for a long time. The sound producing device of the present invention can work in an open field, and the size can cover the concha or even the whole ear, so as to ensure the playing effect of the bass part of the sound, and form a noise cancellation area with the microphone, so that the ear can feel good noise cancellation performance. In addition, the present invention adopts a multi-angle and multi-support structure design in the wearing aspect, so that a user can wear the headphone more firmly, and the user can wear for a longer time through a comfortable ergonomic design. In this way, user needs and market demands are well met.

The above is only a preferred embodiment of the present invention, and is not intended to limit the present invention. Any modification, equivalent replacement, improvement, etc. made within the principle of the present invention shall fall within the scope of protection of the present invention.

The invention claimed is:

1. An open-ear hook-type wearable sound producing device, comprising: a main body and an ear hook connected to the main body, wherein the device is oriented with respect to a human ear, with its upper and lower sides corresponding to upper and lower sides of the human ear respectively, the main body comprises a front cavity and a rear cavity, the front cavity is located at a side of the main body close to a human ear, and the rear cavity is located at an opposite side of the main body away from the human ear; at least one speaker is arranged in the main body, and both a diaphragm of the at least one speaker and at least one microphone are located in the front cavity;

a distance between an orifice of a forward vent and an ear canal entrance point (EEP) is 0.1 to 50 mm; and a distance between a pickup end of the at least one microphone and the EEP is 0.5 to 10 mm;

the at least one microphone in the front cavity is located between the forward vent and the diaphragm of the at least one speaker, and a pickup end of the at least one microphone in the front cavity is located within a diaphragm covering area, which is a projection area of the diaphragm along a direction of a central axis of the diaphragm towards the human ear, of the at least one speaker;

the front cavity is provided with a forward vent at the lower side of the device, and the rear cavity is provided with an inverse vent at the upper side of the device; the inverse vent and the forward vent are configured to be offset from the central axis of the diaphragm of the speaker and located at upper and lower sides of the central axis of the diaphragm of the speaker;

wherein a first acoustic wave enhancement area is formed around the forward vent; a second acoustic wave enhancement area is formed around the inverse vent; a plurality of microphones are provided in the front cavity, the main body further comprises a first microphone hole and a second microphone hole, each of the first microphone hole and the second microphone hole corresponds to one microphone, and the first microphone hole, the second microphone hole and microphones corresponding to the first microphone hole and the second microphone hole are arrayed outside the first acoustic wave enhancement area and the second acoustic wave enhancement area.

2. The open-ear hook-type wearable sound producing device of claim 1, wherein an XYZ coordinate reference system is established with the EEP defined as an origin point, a direction from the EEP to an outer side of the ear defined as a positive X-axis, a direction from the EEP to a front side of the ear defined as a positive Y-axis, and a direction from the EEP to an upper side of the ear defined as a positive Z-axis, so that coordinates of the orifice of the forward vent are located between (0.1 mm, −22.4 mm, −25.7 mm) and (15.3 mm, 23.2 mm, 33.3 mm) in the XYZ coordinate reference system.

3. The open-ear hook-type wearable sound producing device of claim 2, wherein coordinates of the orifice of the inverse vent are located between (5 mm, −24 mm, −27.2 mm) and (29.3 mm, 25 mm, 36 mm) in the XYZ coordinate reference system.

4. The open-ear hook-type wearable sound producing device of claim 1, wherein the at least one speaker has a cross-sectional area of 176.625 to 1256 $mm^2$ and a thickness of 2 to 13 mm.

5. The open-ear hook-type wearable sound producing device of claim 1, wherein a distance between the pickup end of the at least one microphone and the diaphragm of the at least one speaker is 1.5 to 3 mm.

6. The open-ear hook-type wearable sound producing device of claim 1, wherein the main body covers an area of 176.625 to 11304 $mm^2$ over an auricle of the human ear.

7. The open-ear hook-type wearable sound producing device of claim 1, wherein the main body comprises, but is not limited to, a circular, oval or racetrack-shaped plastic shell.

8. The open-ear hook-type wearable sound producing device of claim 1, wherein a noise-cancellation area formed by the at least one speaker and the at least one microphone covers an area of 176.625 to 11304 $mm^2$ over the auricle and an ear canal entrance area of the human ear.

* * * * *